Sept. 10, 1968     W. A. BOOTHE     3,400,729
RATE OF CHANGE OF PRESSURE SENSOR
Filed April 1, 1965
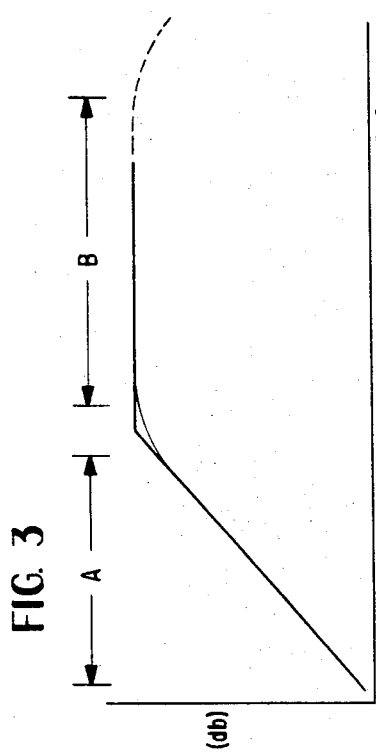
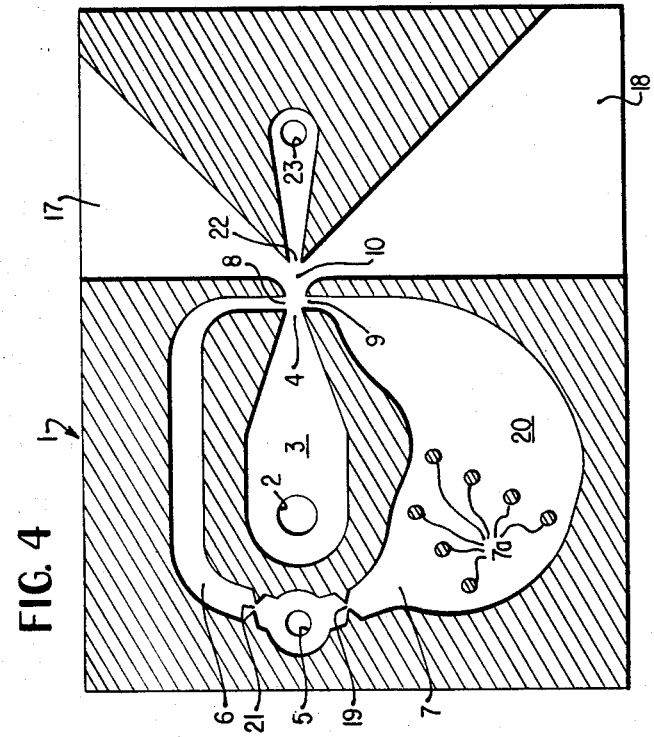
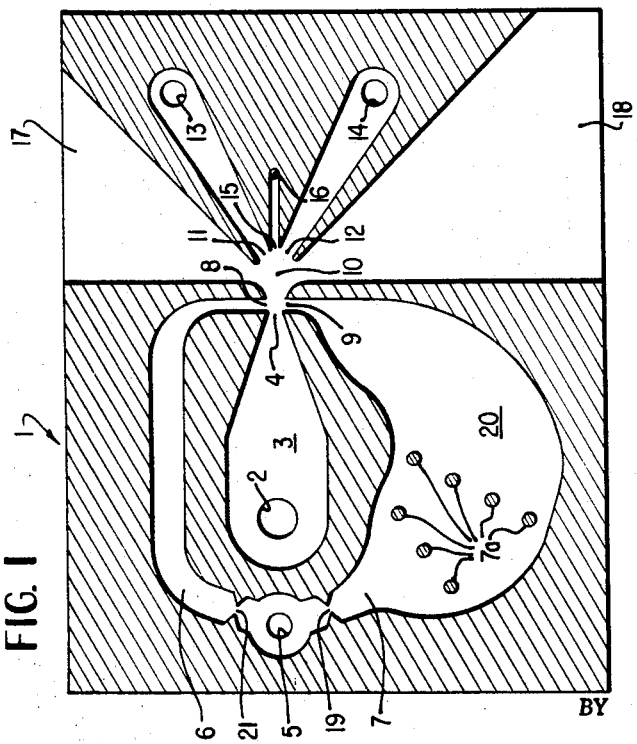
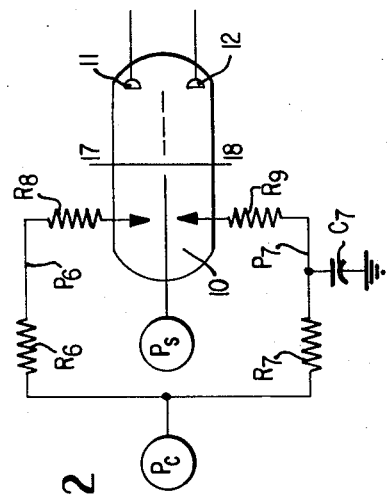
INVENTOR
WILLIS A. BOOTHE
BY *Frank L. Neuhauser*
ATTORNEY

United States Patent Office 3,400,729
Patented Sept. 10, 1968

3,400,729
RATE OF CHANGE OF PRESSURE SENSOR
Willis A. Boothe, Scotia, N.Y., assignor to General
Electric Company, a corporation of New York
Filed Apr. 1, 1965, Ser. No. 444,599
4 Claims. (Cl. 137—81.5)

ABSTRACT OF THE DISCLOSURE

An analog fluid element which is responsive to the rate of change of pressure of a control fluid stream. A control fluid, the rate of change of pressure of which is to be sensed, is supplied through two passages to a pair of control nozzles which direct the fluid perpendicularly from opposite directions into a power fluid jet. Both passages include a resistive fluid component and one of the passages in addition includes an inductive fluid component which delays the response of the associated control nozzle to transient fluid pressure signals. Thus, when the pressure of the control stream is changing, the momentum or pressure of the fluid issuing from one of the control nozzles will be greater than that of the other and will deflect the power fluid jet.

My invention relates to analog fluid elements, and more specifically to analog fluid elements which are responsive only to the rate of change of pressure of a control fluid stream.

Analog fluid elements such as fluid amplifiers are being considered for use in numerous fields, for instance: as components of computer circuits and control systems, as event sensing elements for fluid operated apparatus, and as power controlling devices for operating valves.

The prior fluid amplifier art is void of analog fluid elements which are responsive only to the rate of change of pressure from a single fluid pressure signal source. Furthermore, the prior art is void of analog fluid elements which act as a fluid blocking capacitor. A series connected fluid accumulator or fluid capacitor shown in the prior art is the equivalent of an electronic capacitor having one terminal grounded and thus does not perform a blocking function. Apparatus which is responsive only to a rate of change in fluid pressure signals employs moving parts such as pistons, diaphragms, and valves which are undesirable in fluid amplifier systems. These systems are often subjected to high temperature, vibration, shock, and other adverse conditions which cause apparatus employing moving parts to be unreliable and subject to wear.

Accordingly, it is an object of my invention to provide a novel and improved analog fluid element which is sensitive only to the rate of change of pressure of a fluid control signal.

It is a further object of my invention to provide a novel and improved pressure sensor responsive to the rate of change of pressure of a fluid control signal and having no moving parts.

It is another object of my invention to provide a novel and improved fluid operated rate of change of pressure sensor operable with either a compressible or an incompressible fluid.

Another object of my invention is to provide a novel and improved analog fluid element which may be used as a blocking capacitor for fluid amplifiers.

Briefly stated, and in accordance with one aspect of my invention, I provide an analog fluid element wherein a first fluid jet is controllably deflected either by an exchange of momentum between a control fluid stream and the first fluid jet or by a difference in the pressures in the first fluid jet from a plurality of pressure sources fed by the control fluid stream. A fluid conducting means directs the control fluid stream to a plurality of control means which are adapted to cause the control fluid stream to deflect the first fluid jet. The control means may comprise a plurality of fluid passages terminating in control nozzles which are disposed on opposite sides of and adjacent to the first fluid jet and perpendicular to the path of the jet. The control fluid stream flows through the passages and is directed against opposite sides of the first fluid jet. The control means are adapted to cause the control fluid to deflect the first fluid jet in an amount which is proportional to rapid changes in pressure of the control fluid stream. This is accomplished by delaying the response at one of the control nozzles to transient fluid pressure signals.

Other objects and features of my invention will be more fully understood from the following description of two embodiments of my invention and from the following drawings in which:

FIG. 1 is a top plan view which illustrates an analog fluid element constructed in accordance with my invention;

FIG. 2 is a schematic diagram of the analog fluid element of FIG. 1 shown partly in electrical circuit analogy;

FIG. 3 is an attenuation diagram showing the frequency characteristics of the device;

FIG. 4 is a top plan view of an analog fluid element comprising a second embodiment of my invention.

The analog fluid elements shown in FIGS. 1 and 4 each comprises a defined fluid flow configuration which is contained in a base member formed of a suitable, nonporous, structurally rigid material such as glass, plastic, or metal. A flat cover plate, which is not shown, confines the fluid flow within the defined configuration. Various ports and vents are provided through the cover plate to interconnect the analog fluid element with additional elements or with an ambient pressure region. Any suitable fluid may be employed such as air, water, etc.

Referring to a first preferred embodiment of my invention which is shown in FIG. 1, an analog fluid element 1 comprises an analog fluid amplifier and a means for providing a first fluid jet to be controlled, which means includes a supply port 2 which is connected through a supply passage 3 to a power nozzle 4 through which the jet passes. The means for providing a first fluid jet also includes a source of fluid flow, indicated as $P_s$ in FIG. 2, which is connected to the supply port 2.

A fluid conducting means including a control port 5 connects a source of control pressure, which is indicated as $P_c$ in FIG. 2, to the analog fluid element 1. The control port 5 is connected to a plurality of control means, comprising fluid passages 6 and 7, which terminate in control nozzles 8 and 9, respectively. The control nozzles 8 and 9 are each adjacent to the power nozzle 4 and are shown perpendicularly disposed to and on opposite sides of the path of a first fluid jet which is conducted from the power nozzle 4. However, for some applications of my invention the control nozzles may not be perpendicular to the path of the first fluid jet.

An interaction region 10 is provided between the nozzles 4, 8, and 9 and a pair of apertures comprising receivers 11 and 12. The receivers 11 and 12 are connected to a pair of output ports 13 and 14, respectively. A center vent 15 which is provided between the receivers 11 and 12, leads to a vent port 16. A pair of vents 17 and 18 are located at either side of the interaction region 10.

The fluid passage 7 contains a means for delaying the response to a changing fluid pressure at the control nozzle 9 which comprises a fluid time delay circuit, which in this embodiment of my invention includes a resistive component in the form of a fluid restrictor 19 comprising a reduced section of passage 7, and a reactive component in the form of a fluid capacitor 20 comprising an enlarged volume of passage 7. The fluid passage 6 has no fluid time delay circuit, but only has a resistive element in the form of a fluid restrictor 21.

A first fluid jet is conducted from the source of fluid flow $P_s$ and through the supply port 2, the supply passage 3, and the power nozzle 4. This source of fluid flow $P_s$ maintains the first fluid jet at a relatively constant and high fluid pressure and flow rate. The first fluid jet is conducted from the power nozzle 4 to the interaction region 10.

A control fluid stream is conducted from the source of control pressure $P_c$, through the control port 5, and to the fluid passages 6 and 7. In the present embodiment of my invention, the fluid passage 7 has the time delay circuit which comprises the restrictor 19 and the fluid capacitor 20. The fluid capacitor 20 is offset between the restrictor 19 and the nozzle 9 so that the fluid does not pass directly through it, but rather provides the desired delay. Futhermore, a number of posts 7(a) is added in the fluid passage 7 to prevent the control fluid stream from "streaming" from the restrictor 19 directly to the control nozzle 9. The fluid passage 6 has a fluid resistor, a restrictor 21, merely to balance the effect of the restrictor 19 when there is a constant pressure from control pressure source $P_c$. The control fluid stream flows through the fluid passages 6 and 7 and from the control nozzles 8 and 9 in the form of a pair of control jets and interacts with the first fluid jet in the interaction region 10. The first fluid jet flows in a direction perpendicular to that of the control jets when the effects of both control jets thereon are equal. However, when the momentum of the fluid from one of the control jets or the pressure from one of the jets is greater than that from the other, depending on the principle of operation utilized in a particular analog fluid element, the first fluid jet is deflected away from the control jet having the greater effect.

In order to appreciate the operation on my invention, reference may be had to FIG. 2 which is a schematic diagram of my invention, using electrical circuit analogy to as great an extent as is practical. In this respect, the pressure P at the control pressure source $P_c$ is analogous to an electrical voltage, and the weight flow rate $w$ of the fluid from the control pressure source $P_c$ is analogous to an electrical current. The weight flow rate is measured in pounds of fluid flowing past a particular point per second. The control pressure source $P_c$ is connected through a resistor $R_6$, corresponding to restrictor 21 and through a resistor $R_8$, corresponding to the control nozzle 8, to the interaction region 10. The control pressure source $P_c$ is also connected through a resistor $R_7$ corresponding to the restrictor 19, past a capacitor $C_7$ corresponding to the fluid capacitor 20, and through a resistor $R_9$ corresponding to the control nozzle 9 to the interaction region 10. The equations representing the characteristics of the fluid passages 6 and 7 during a period of constant pressure P at the control pressure source $P_c$ so that the pressure $P_7$ across capacitor $C_7$ remains constant are:

$$P = w_6(R_6 + R_8) \quad (1a)$$
$$P = w_7(R_7 + R_9) \quad (1b)$$

where $w_6$ is the weight flow rate of the fluid flowing through fluid passage 6 and $w_7$ is the weight flow rate of fluid flowing through the fluid passage 7. Assuming for many applications of my invention that $R_6 = R_7$ and that $R_8 = R_9$, $w_6 = w_7$.

With a constant control pressure P, the first fluid jet is directed between the receivers 11 and 12, toward the center vent 15. The center vent 15 conducts a portion of the fluid from the interaction region 10 through the vent port 16 and to the ambient pressure region. The vents 17 and 18 also conduct fluid from the interaction region 10 to the ambient pressure region. The ambient pressure region may be the atmosphere or it may be a controlled pressure region, where for some applications of my invention the pressure at the interaction region 10 is to be kept at a critical pressure level, or it may be a sump where it is desired to retain the fluids which are flowing in the interaction region.

The use of the center vent 15 is optional to my invention, and it may be omitted so that the region between the receivers 11 and 12 joins together in an apex or a splitter. When a constant pressure is applied, the receivers 11 and 12 receive substantially equal amounts of the fluid from the interaction region 10, regardless of whether the center vent 15 is included in the analog fluid element 1 or not.

When a change of pressure $\Delta P$ occurs at the control pressure source $P_c$ as a function of time and changes the pressure on the control fluid, this causes a change in the weight flow rate $w$ in the fluid flow passages 6 and 7 and changes in the pressures measured in the passages.

Where $\Delta$ denotes a change from a quiescent value of a variable parameter such as a weight flow rate, a pressure or a deflection of the first fluid jet, and $\theta$ represents a deflection of the first fluid jet issuing from the power nozzle 4, $$\Delta \theta = K_1(\Delta P_6 - \Delta P_7) = K_1(P_6 - P_7) \quad (2)$$

$K_1$ is a constant which varies with the size of the fluid components used in the fluid element, $P_6$ is a pressure measured between the fluid resistors $R_6$ and $R_8$, and $P_7$ is the pressure measured at the fluid capacitor $C_7$. The Equation 2 for the change of deflection $\Delta \theta$ holds true for both the pressure and momentum control type fluid elements.

The following derivation is used to obtain an equation showing the relationship between a change in the deflection of the first fluid jet $\Delta \theta$, and the change in the pressure $\Delta P$, from the pressure source $P_c$. A diagram is made from this equation to show the frequency range over which the fluid element can be used as a change of pressure sensor and the frequency range over which the fluid element can be used as a blocking capacitor or an "A-C" amplifier for pressure signals. It is seen that for a small increment of pressure $\Delta P$, in fluid passage 6.

$$\Delta P_6 = R_8 \Delta w_6 \quad (3)$$

and $$\Delta P = \Delta P_6 + R_6 \Delta w_6 \quad (4)$$

Solving Equation 4 for $\Delta w_6$:

$$\Delta w_6 = \frac{1}{R_6}(\Delta P - \Delta P_5) \quad (5)$$

Substituting Equation 5 into Equation 3 and solving for $\Delta P_6$, $$\Delta P_5 = \frac{R_8}{R_6} \Delta P - \frac{R_8}{R_6} \Delta P_6 \quad (6)$$

$$\Delta P_6 = \frac{\Delta P}{1 + \frac{R_6}{R_8}} \quad (7)$$

Where $w_9$ is the weight flow rate of fluid flowing through $R_9$ and $P_7$ is the pressure at the fluid capacitor $C_7$, for a small increment of pressure $\Delta P$ in fluid passage 7, $$\Delta P_7 = R_9 \Delta w_9 \quad (8)$$

and $$\Delta w_7 = \frac{\Delta P - \Delta P_7}{R_7} \quad (9)$$

Furthermore, where $s$ is allowed to equal a complex variable and the equations for $P_7$ are written as functions of $s$:

$$\Delta P_7 = \frac{1}{C_7 s}(\Delta w_7 - \Delta w_9) \quad (10)$$

or $$\Delta w_9 = -C_7 s \Delta P_7 + \Delta w_7 \quad (11)$$

Substituting Equation 9 into Equation 11, $$\Delta w_9 = -C_7 s \Delta P_7 + \frac{\Delta P - \Delta P_7}{R_7} \quad (12)$$

$$\Delta w_9 = \frac{1}{R_7}[\Delta P - (1 + R_7 C_7 s) \Delta P_7] \quad (13)$$

or $$\Delta P_7 = \left(\frac{1}{1 + \frac{R_7}{R_9}}\right) \cdot \frac{\Delta P}{1 + \left(\frac{R_7 C_7}{1 + \frac{R_7}{R_9}}\right)s} \quad (14)$$

In normal practice,
$$R_6 = R_7$$
and
$$R_8 = R_9$$

so that Equation 14 becomes $$\Delta P_7 = \left(\frac{1}{1 + \frac{R_6}{R_8}}\right) \cdot \frac{\Delta P}{1 + \left(\frac{R_6 C_7}{1 + \frac{R_6}{R_8}}\right)s} \quad (14a)$$

Substituting the value of $\Delta P_6$ from Equation 7 and the value of $\Delta P_7$ from Equation 14a into Equation 2:

$$\Delta \theta = K_1 \left[\frac{1}{1 + \frac{R_6}{R_8}}\right]\left[1 - \frac{1}{1 + \frac{R_6 C_7}{1 + \frac{R_6}{R_8}}s}\right]\Delta P \quad (15)$$

$$\Delta \theta = \frac{K}{\left[1 + \frac{R_6}{R_8}\right]^2} \cdot \frac{R_6 C_7}{\left[1 + \frac{R_6 C_7}{1 + \frac{R_6}{R_8}}s\right]} \Delta P \quad (16)$$

Now where it is provided that $$T = \frac{R_6 C_7}{1 + \frac{R_6}{R_8}} \quad (17)$$

$$\Delta \theta = \frac{K_1}{1 + \frac{R_6}{R_8}} \left[\frac{Ts}{1 + Ts}\right] \Delta P \quad (18)$$

$$\frac{\Delta \theta}{\Delta P} = \frac{K_1}{1 + \frac{R_6}{R_8}} \left[\frac{Ts}{1 + Ts}\right] \quad (19)$$

FIG. 3 shows the attenuation characteristics of the fluid element, as represented by Equation 19, wherein the change of deflection of the first fluid jet per change in the pressure from the pressure source $P_c$, $\Delta \theta / \Delta P$, is plotted in decibels (db) against the logarithm of the change in frequency of $\Delta P$. The diagram shows two portions of the characteristics, A and B, which are covered by the present analyses. In a first portion A of the characteristics, the term $\Delta \theta / \Delta P$ increases linearly with the frequency. Thus, the fluid element may be used in this frequency range as a rate of change of pressure sensor to sense the amount of pressure change per unit of time.

In a second portion B of the characteristics, the term $\Delta \theta / \Delta P$ does not vary with the frequency. Rather, the change in deflection is solely dependent on the change in the magnitude of the pressure at the pressure source $P_c$, thus the fluid element may be used in this frequency range as a blocking capacitor or as an "A-C" amplifier.

The characteristics of the fluid element attenuate beyond the B portion due to physical limitations of the fluid element which are well known in the art.

For a change in the pressure in either portion A or B of the characteristics, the effect will occur on the fluid flowing through control nozzle 8 prior to that on the fluid flowing through the control nozzle 9 because the fluid capacitor $C_7$ must be charged or discharged in accordance with the pressure change before the change is effective at the control nozzle 9. Therefore, an increase in the pressure at the pressure source $P_c$ causes the first fluid jet to be initially deflected away from control nozzle 8 by the increase in the pressure or momentum of the fluid flowing through control nozzle 8. Thus, the fluid flows through the receiver 12 in a greater proportion than through the receiver 11 as long as pressure $P_c$ continues to rise. However, a decrease in the pressure at the pressure source $P_c$ causes the first fluid jet to be initially deflected away from the control nozzle 9 since the pressure or momentum of the fluid flowing through control nozzle 8 decreases. Thus, the fluid flows in a greater proportion through the receiver 11 than through the receiver 12 as long as $P_c$ continues to drop.

Therefore, in accordance with one preferred embodiment of my invention shown in FIG. 1, a monitoring apparatus may be placed across the output ports 13 and 14 to measure a difference in pressure across these ports caused by a change in pressure at the pressure source $P_c$. The difference in pressure measured by the monitoring apparatus will be indicative of the amount of pressure change per unit of time.

An example of a monitoring apparatus for the first preferred embodiment shown in FIG. 1 is the well-known vented analog fluid amplifier having a pair of control ports, one of which is connected to the output port 13 and the other of which is connected to the output port 14. Since the output of the vented analog fluid amplifier is only affected by a difference in pressure across its control ports, my invention is operable in conjunction therewith.

FIG. 4 shows another embodiment of my invention. The configuration is similar to that described in FIG. 1, except that a receiver 22 is substituted for the receivers 11 and 12 and for the center vent 15, and the output port 23 is substituted for the output ports 13 and 14 and for the vent port 16. Similar components in FIGS. 1 and 4 are represented by the same reference numerals. Using this configuration, the first fluid jet from the power nozzle 4 may be normally directed through the center of the receiver 22 or may be normally directed toward one side of the receiver 22. The latter relationship between the first fluid jet and the receiver 22 may be obtained in any convenient manner, for example, by offsetting the receiver 22 from the center of the power nozzle 4.

When the first fluid jet is normally directed toward the center of receiver 22, a change in the pressure at the control pressure source $P_c$ will initially deflect the first fluid jet either toward vent 18, with an increase in pressure, or toward vent 17, with a decrease in pressure. This deflection occurs in the same manner as the deflection discussed with respect to the embodiment shown in FIG. 1. As a result, there will be a decrease in the fluid flow through the receiver 22 no matter which way the first fluid jet is deflected, toward the vent 17 or the vent 18. Thus, a monitoring apparatus connected to the output port 23 senses a decrease in fluid pressure which is proportional to the magnitude of the deflection caused by a pressure change at $P_c$, but is insensitive to the direction of the change, increase or decrease in pressure, assuming that the receiver 22 is symmetrically constructed.

When the first fluid jet is normally directed toward one side of the receiver 22, for example, toward the side between the receiver 22 and the vent 17, only a portion of the first fluid jet flows through the receiver 22. A rate of increase in the pressure at the control pressure source $P_c$, as discussed with respect to FIG. 1, deflects the first fluid jet toward the receiver 22. Therefore, a monitoring apparatus connected to the output port 23 senses an increase in pressure. When the pressure at the control pressure source $P_c$ decreases, the first fluid jet is deflected toward the vent 17. Therefore, there is a decrease in fluid flow through the receiver 22, and a monitoring apparatus connected to the output port 23 senses a decrease in fluid pressure. Thus, with the fluid flow normally directed between the vent 17 and the receiver 22, a monitoring apparatus connected to the output port 23 senses a change in pressure which is proportional to the deflection of the first fluid stream caused by a change of pressure at the control pressure source $P_c$. It is evident to one skilled in the art that the analog fluid element in this embodiment must be operated in a linear portion of the dynamic pressure profile of the first fluid jet to provide a response which is linear with respect to the deflection of the first fluid jet. It is obvious from the foregoing that if the first fluid jet is normally directed between the receiver 22 and the vent 18, a monitoring apparatus connected to the output port 23 senses a change of pressure there which is inversely proportional to the deflection of the first fluid jet caused by a dynamic change of pressure at the control pressure source $P_c$.

In the illustrated embodiments of my invention, the fluid passage 7 has a time delay circuit which comprises the restrictor 19 and the fluid capacitor 20. However, my invention contemplates a fluid passage utilizing any means for delaying the response to a changing pressure signal at one of a pair of control nozzles. For example, such a means may comprise a time delay circuit having one or a number of fluid type resistors, including such restrictors as a nozzle, a sharp-edged orifice, or a capillary section. Also, one or a number of reactive fluid flow components may be employed in the time delay circuit, such as the fixed volume which is used as a capacitor-to-ground with a compressible fluid or a hydraulic accumulator which is used as a capacitor-to-ground with an incompressible fluid or a relatively long and narrow volume which is used as a fluid inductor.

While the fluid element of my invention is not necessarily restricted in its usefulness to any one application, it is particularly useful in one portion of its characteristics in fluid control systems and computer circuits as a component which performs a function similar to that of a blocking capacitor or an A-C amplifier used in electronic circuits: it blocks a constant pressure signal but will pass "A-C" changes in pressure. This invention is also useful in another portion of its characteristics as a sensing element. For example, it can be used as a compressor stall sensor or as an apogee detector for missiles or for a sensor of any event which can be translated into a pressure signal having a rate of pressure change.

My invention is not limited to the embodiments shown herein or to specific apparatus discussed above. To the contrary, my invention is capable of numerous modifications, as recognized by those skilled in the art, without deviating from the scope thereof and should not be limited in any sense except as defined by the following claims.

What I claim as new and desire to secure by Letters Patent of the United States is:

1. A rate of change of pressure sensor of the analog, fluid amplifying type comprising:
    (a) means for providing a first fluid jet to be controlled,
    (b) first and second fluid passages terminating in first and second control nozzles, respectively, for controlling the first fluid jet,
    (c) a control port for directing a control fluid stream to said fluid passages,
    (d) a fluid time delay circuit included in said first fluid passage, said fluid time delay circuit including a resistive fluid component and an inductive fluid component, and
    (e) a resistive fluid component in said second fluid passage, said fluid time delay circuit delaying the response to a change in the pressure conditions of the control fluid stream at said first control nozzle, so that the first fluid jet is deflected by the control fluid stream in proportion to the rate of pressure change of the control fluid stream.

2. A rate of change of pressure sensor of the analog, fluid amplifying type comprising:
    (a) means for providing a first fluid jet to be controlled,
    (b) an aperture for normally intercepting the first fluid jet,
    (c) first and second fluid passages terminating in first and second control nozzles, respectively, for controlling the first fluid jet,
    (d) a control port for directing a control fluid stream to said fluid passages,
    (e) a fluid time delay circuit in said first fluid passage, said fluid time delay circuit including a resistive fluid component and an inductive fluid component, said inductive fluid component comprising a relatively long and narrow volume, and
    (f) a resistive fluid component in said second fluid passage, said fluid time delay circuit delaying the response to a change in the pressure conditions of the control fluid stream at the first control nozzle, so that first fluid jet is deflected by the control fluid stream away from said aperture in proportion to the rate of pressure change of the control fluid stream.

3. A rate of change of pressure sensor of the analog, fluid amplifying type comprising:
    (a) means for providing a first fluid jet to be controlled,
    (b) an aperture for normally intercepting a fraction of the first fluid jet,
    (c) first and second fluid passages terminating in first and second control nozzles, respectively, for controlling the first fluid jet,
    (d) a control port for directing a control fluid stream to said fluid passages,
    (e) a fluid time delay circuit in said first fluid passage, said fluid time delay circuit including a resistive fluid component and an inductive fluid component, said inductive fluid component comprising a relatively long and narrow volume, and
    (f) a resistive fluid component in said second passage, said fluid time delay circuit in said first fluid passage delaying the response to a change in the pressure conditions of the control fluid stream at the first control nozzle, so that the control fluid stream deflects the first fluid jet with respect to said aperture in proportion to the rate of pressure change of the control fluid stream.

4. A rate of change of pressure sensor of the analog, fluid amplifying type comprising:
    (a) means for providing a first fluid jet to be controlled,
    (b) first and second apertures for intercepting the first fluid jet, the first fluid jet normally directed between said apertures,
    (c) first and second fluid passages terminating in first and second control nozzles, respectively, for controlling the first fluid jet,
    (d) a fluid time delay circuit in said first fluid passage, said fluid time delay circuit including a resistive fluid component and an inductive fluid component, said inductive fluid component comprising a relatively long and narrow volume,
    (e) a resistive fluid component in said second fluid passage,
    (f) a control port for directing a control fluid stream to said fluid passages, said fluid time delay circuit delaying the response at the first control nozzle to a change in the pressure conditions of the first fluid stream, so that the control fluid stream deflects the first fluid jet toward one of said apertures in proportion to the rate of pressure change of the control fluid stream.

References Cited

UNITED STATES PATENTS

| | | | |
|---|---|---|---|
| 3,122,165 | 2/1964 | Horton | 137—81.5 |
| 3,238,959 | 3/1966 | Bowles | 137—81.5 |
| 3,279,488 | 10/1966 | Jones | 137—81.5 |

M. CARY NELSON, *Primary Examiner.*

W. R. CLINE, *Assistant Examiner.*